US009853986B2

(12) United States Patent
Dash et al.

(10) Patent No.: US 9,853,986 B2
(45) Date of Patent: Dec. 26, 2017

(54) CLUSTERING EVENT DATA BY MULTIPLE TIME DIMENSIONS

(75) Inventors: Debabrata Dash, Renes Vaud (CH); Wenting Tang, Sunnyvale, CA (US); Marylou Orayani, San Jose, CA (US)

(73) Assignee: EntIT Software LLC, Sunnyvale, CA (US)

( * ) Notice: Subject to any disclaimer, the term of this patent is extended or adjusted under 35 U.S.C. 154(b) by 0 days.

(21) Appl. No.: 14/359,261

(22) PCT Filed: Jan. 26, 2012

(86) PCT No.: PCT/US2012/022775
§ 371 (c)(1),
(2), (4) Date: May 19, 2014

(87) PCT Pub. No.: WO2013/081650
PCT Pub. Date: Jun. 6, 2013

(65) Prior Publication Data
US 2014/0359771 A1 Dec. 4, 2014

Related U.S. Application Data

(60) Provisional application No. 61/564,207, filed on Nov. 28, 2011.

(51) Int. Cl.
*H04L 29/06* (2006.01)
*G06F 17/30* (2006.01)
(Continued)

(52) U.S. Cl.
CPC ...... *H04L 63/1416* (2013.01); *G06F 11/3476* (2013.01); *G06F 17/30699* (2013.01);
(Continued)

(58) Field of Classification Search
CPC .......... G06F 2201/00; G06F 2201/835; G06F 2201/86; G06F 17/30705; G06F 17/30699;
(Continued)

(56) References Cited

U.S. PATENT DOCUMENTS 7,461,073 B2 12/2008 Gao et al.
7,788,521 B1 8/2010 Sim-Tang
(Continued)

FOREIGN PATENT DOCUMENTS

CN 1717652 A 1/2006
CN 102239472 A 11/2011

OTHER PUBLICATIONS

International Searching Authority, Appl. No. PCT/US2012/022775, filed Jan. 26, 2012, Search Report and Written Opinion, 9 pp, dated Sep. 17, 2012.

*Primary Examiner* — Robert Leung
*Assistant Examiner* — Ayoub Alata

(57) ABSTRACT

Systems and methods for processing log data are provided. A set of data chunks is determined. Each data chunk is associated with a set of events, which are grouped according to a primary time dimension field of each event of the set of events. A metadata structure is determined for each of the data chunks. The metadata structure includes comprises a range of the primary time dimension field of all of the events in the data chunk and a range of a secondary time dimension field of all of the events in the data chunk. A subset of the data chunks is selected. A data chunk associated with at least one event of the plurality of events is generated according to the secondary time dimension field of the at least one event.

20 Claims, 7 Drawing Sheets

(51) Int. Cl.
*G06F 21/55* (2013.01)
*G06F 11/34* (2006.01)

(52) U.S. Cl.
CPC ...... *G06F 17/30705* (2013.01); *G06F 21/552* (2013.01); *H04L 63/1408* (2013.01); *G06F 2201/86* (2013.01); *G06F 2221/2151* (2013.01); *H04L 63/1441* (2013.01)

(58) Field of Classification Search
CPC ......... G06F 2221/2151; G06F 11/3476; G06F 11/3466; G06F 21/552; H04L 63/14; H04L 63/1416; H04L 63/1408; H04L 63/1441

See application file for complete search history.

(56) References Cited

U.S. PATENT DOCUMENTS

| | | |
|---|---|---|
| 2005/0050060 A1* | 3/2005 | Damm .................... H04L 45/00 |
| 2008/0263105 A1 | 10/2008 | Nakamura |
| 2009/0199118 A1* | 8/2009 | Sabato .................. G06F 11/321 |
| | | 715/765 |
| 2010/0011031 A1* | 1/2010 | Huang ................ H04L 63/1408 |
| | | 707/E17.007 |
| 2010/0106723 A1 | 4/2010 | Lee |
| 2010/0280927 A1* | 11/2010 | Faith ................ G06Q 10/06375 |
| | | 705/30 |
| 2011/0035379 A1 | 2/2011 | Chen et al. |
| 2011/0099136 A1 | 4/2011 | Barajas et al. |
| 2011/0185234 A1 | 7/2011 | Cohen et al. |

* cited by examiner

CLUSTERING EVENT DATA BY MULTIPLE TIME DIMENSIONS

I. CROSS-REFERENCES

This application claims priority from U.S. Provisional Patent Application No. 61/564,207, filed Nov. 28, 2011, titled "CLUSTERING OF EVENT DATA BY MULTIPLE TIME DIMENSIONS,", which is hereby incorporated by reference, as if set forth in full in this document, for all purposes. This application incorporates by reference in its entirety U.S. application Ser. No. 12/554,541, filed Sep. 4, 2009, titled "STORING LOG DATA EFFICIENTLY WHILE SUPPORTING QUERYING," and U.S. application Ser. No. 11/966,078, filed Dec. 28, 2007, titled "STORING LOG DATA EFFICIENTLY WHILE SUPPORTING QUERYING TO ASSIST IN COMPUTER NETWORK SECURITY."

II. BACKGROUND

The field of security information/event management (SIM or SIEM) is generally concerned with 1) collecting data from networks and networked devices that reflects network activity and/or operation of the devices and 2) analyzing the data to enhance security. For example, the data can be analyzed to identify an attack on the network or a networked device and determine which user or machine is responsible. If the attack is ongoing, a countermeasure can be performed to thwart the attack or mitigate the damage caused by the attack. The data that is collected usually originates in a message (such as an event, alert, or alarm) or an entry in a log file, which is generated by a networked device. Typical networked devices include firewalls, intrusion detection systems, and servers.

Each message or log file entry ("event") is stored for future use. Stored events can be organized in a variety of ways. Each organizational method has its own advantages and disadvantages when it comes to writing event data, searching event data, and deleting event data.

III. BRIEF DESCRIPTION OF THE DRAWINGS

The present disclosure may be better understood and its numerous features and advantages made apparent by referencing the accompanying drawings.

IV. DETAILED DESCRIPTION

Figure 1:
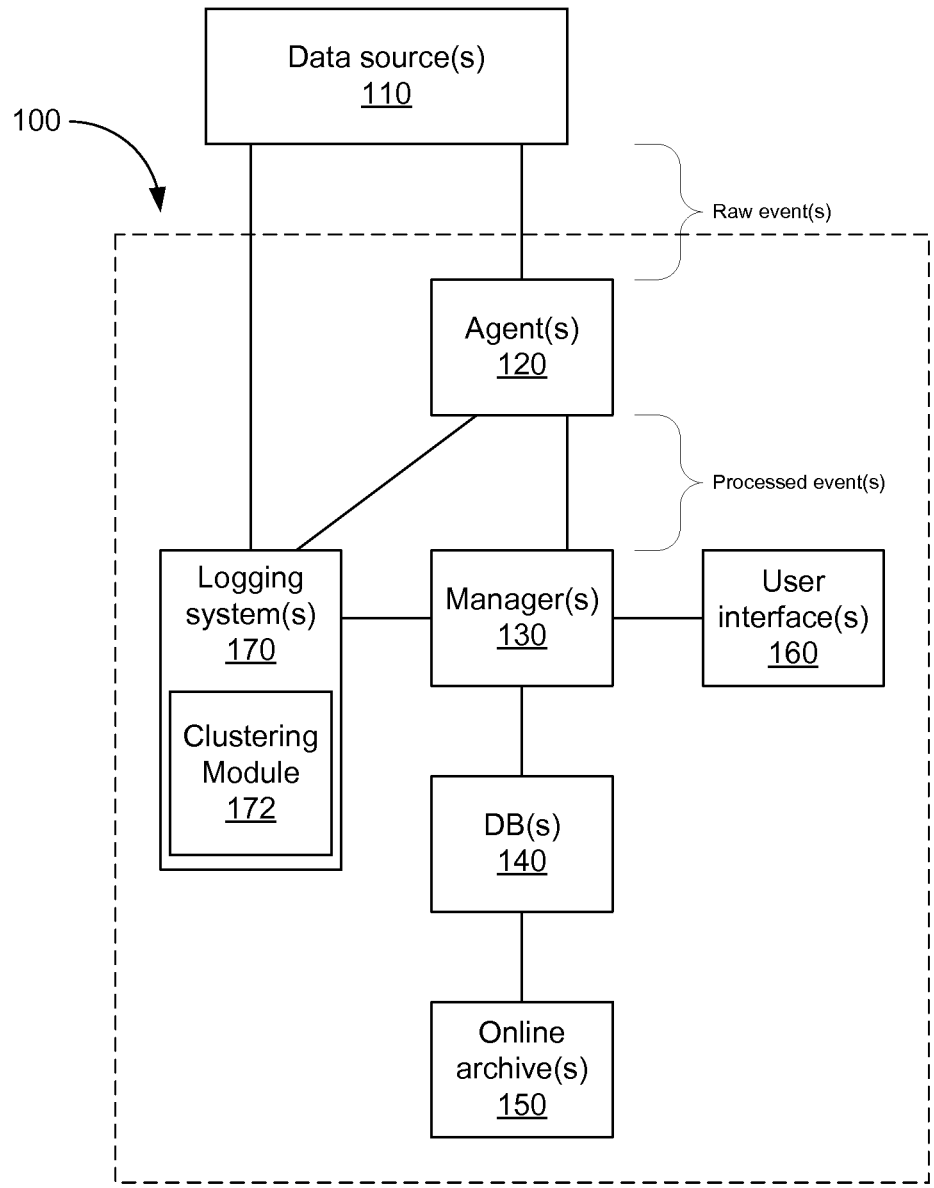
FIG. 1 is a topological block diagram of an environment having an information/event management system in accordance with an embodiment.

Event management systems are becoming significant components of the real-time event management systems. Such systems can be used to gain valuable insights such as real-time security status, network status, or market information.

A logging system stores data, such as security information/events, efficiently while supporting querying for different event attributes. The logging system may be a component of or can be used in conjunction with an event management system or with other systems for further analysis of the logged data. Log data can be generated by various sources (including devices and applications), and can be in any format. Log data is comprised of data instances called "events" that are characterized by at least one time-based attribute or dimension. An event can be, for example, an entry in a log file, an entry in a syslog server, an alert, an alarm, a network packet, an email, or a notification page.

Time is a significant attribute of any logging system. Typically, there are multiple time dimensions associated with events. One dimension may be the time when the event actually occurs (i.e., event occurrence time). Another dimension may be the time when the event is actually received (i.e., receipt time) by the event processing system and/or logging system.

The disparity between the event occurrence time ("et") and the receipt time ("rt") may be caused by various conditions, for example, delays during transmission through a network and failure of a node (e.g., agent) in the security network for some period of time which prevented the down node from sending events to a central logging system. Since the events can be delayed or batched, the time dimensions can be out of sync with each other. The disparity between et and rt may be anywhere from seconds to days, where more severe delay conditions are involved.

Multiple indexes may be created for storing events, for example an index for each time dimension. In the context of events with two time dimensions, using this technique, events are stored, for example in a datafile. A cluster index is created by clustering the events along one of the time dimensions. More specifically, the cluster index is keyed to the time dimension along which the events are clustered ("cluster dimension"). A secondary index is created on the secondary time dimension.

Often times, queries that a user poses to the event management system or to the logging system includes a time dimension. Since there can be multiple time dimensions, the user may query on all those dimensions. The use of multiple indexes may be used to ensure query efficiency across the multiple time dimensions.

In many system deployments with a large volume of events, however, building both the clustered index and the secondary index is prohibitively expensive. The indexes increase the amount of storage needed due to the size of the indices for environments requiring storage of large data.

Furthermore, there is significant maintenance overhead. For example, the clustered index is keyed on rt and the secondary index is keyed on et. Each entry the clustered index includes a unique identifier associated with a datafile that stores the chunk and the location within the datafile where the chunk is stored (e.g., as an offset). Each entry of the secondary index includes a pointer or other reference to at least one entry in the clustered index, since each event is associated with both an event time and a receipt time. Maintaining the integrity of these references can be processor and time intensive.

Additionally, the searching operation on any dimension other than the cluster dimension can be inefficient. For example, where the clustered index is keyed on rt and the secondary index is keyed on et, a query based on et may involve searching on both indexes in order to identify all the clusters that may include events with event times that match the query. More specifically, the secondary index is searched first, based on the et. The entries which satisfy this first search are used to identify the relevant rt entries, since each entry in the secondary index includes a reference to an entry in the clustered index. After determining which rt's correspond to the entries in the secondary index, the related entries in the clustered index are accessed to identify the relevant chunks, which are the chunks that could possibly contain events that have event times that satisfy the query. Then, the identified chunks are disassembled into their constituent events. Finally, the et attribute of each of these events is searched to determine which events satisfy the query.

Such searching methodologies may lead to less than optimal search performance. Where the events are chunked in rt, queries on et are likely to involve the scan of large subsets of the chunks, especially where the chunks include events with long ranges of event occurrence times. Many of the chunks that are identified as potentially relevant for satisfying the query may turn out to be irrelevant, i.e., by not including elements that satisfy the query.

In one embodiment, the scanning may be minimized by clustering the data on multiple dimensions, e.g., clustering on the rt for the entire set of event data, and also clustering on the et, but on a subset of the event data. More specifically, the ranges of et and rt of events in a chunk are minimized while maximizing chunk size (i.e., number of events in a chunk).

As described herein systems and methods for processing log data are provided. A set of data chunks is determined. Each data chunk is associated with a set of events, which are grouped according to a first time dimension field of each event of the set of events. A metadata structure is determined for each of the data chunks. The metadata structure includes a range of the primary time dimension field of all of the events in the data chunk and a range of a secondary time dimension field of all of the events in the data chunk. A subset of the data chunks is selected and disassembled into a plurality of events. A data chunk associated with at least one event of the plurality of events is generated according to the secondary time dimension field of the at least one event.

A logging system includes an event receiver and a storage manager. The event receiver receives log data, processes it, and outputs a row-based and/or column-based data "chunk." The storage manager receives the data chunk and stores it so that it can be queried. The receiver includes buffers that store events and a metadata structure that stores information about the contents of the buffers.

The metadata includes a unique identifier associated with the receiver and the number of events in the buffers. For a field of interest which is receipt time, the metadata includes a minimum value and a maximum value that reflect the range of values of that field over all of the events in the buffers. For a field of interest which is event occurrence time, the metadata includes a minimum value and a maximum value that reflect the range of values of that field over a subset of the events in the buffers. A chunk includes the metadata structure and a compressed version of the contents of the buffers. The portion of the metadata structure that includes the receipt time ranges acts as a search index (i.e., cluster index) when querying event data. The portion of the metadata structure that includes the event occurrence time ranges acts as another search index (i.e., secondary index) when querying event data. As such, if a search is initiated on either time dimension, a lookup is performed on the metadata and the events are searched efficiently and in a scalable manner. The logging system can be used in conjunction with an information/event management system.

Information/Event Management Architecture

FIG. 1 is a topological block diagram of an environment having an information/event management system 100 in accordance with an embodiment. System 100 includes data source(s) 110. A data source 110 is a network node, which can be a device or a software application. Data sources 110 include intrusion detection systems (IDSs), intrusion prevention systems (IPSs), vulnerability assessment tools, firewalls, anti-virus tools, anti-spam tools, encryption tools, application audit logs, and physical security logs. Event data may be provided, for example, by alerts, alarms, network packets, emails, or notification pages.

Types of data sources 110 include security detection and proxy systems, access and policy controls, core service logs and log consolidators, network hardware, encryption devices, and physical security. Typically, security detection and proxy systems include IDSs, IPSs, multipurpose security appliances, vulnerability assessment and management, anti-virus, honeypots, threat response technology, and network monitoring. Typical access and policy control systems include access and identity management, virtual private networks (VPNs), caching engines, firewalls, and security policy management. Core service logs and log consolidators include operating system logs, database audit logs, application logs, log consolidators, web server logs, and management consoles. Typical network hardware includes routers and switches. Typical encryption devices include data security and integrity. Typical physical security systems include card-key readers, biometrics, burglar alarms, and fire alarms.

In the illustrated embodiment, the system 100 includes agent(s) 120, manager(s) 130, database(s) 140, online archive(s) 150, user interface(s) 160, and logging system(s) 170. In some embodiments, these modules are combined in a single platform or distributed in two, three, or more platforms (such as in FIG. 1). The use of this multi-tier architecture supports scalability as a computer network or system grows.

An agent 120 provides an interface to a data source 110. Specifically, the agent 120 collects data ("raw events") from a data source 110, processes the data, and sends the processed data ("events") to a manager 130. The agent 120 can operate anywhere, such as at a separate device communicating via a protocol such as simple network management protocol (SNMP) traps, at a consolidation point within the network, or at the data source 110. For example, if the data source 110 is a software application, the agent 120 can be co-hosted on the device that hosts the data source.

Processing can include normalization, aggregation, and filtering. For example, individual raw events are parsed and normalized for use by the manager 130. Normalization can involve normalizing values (such as severity, priority, and time zone) into a common format and/or normalizing a data structure into a common schema. Events can be categorized using a common, human-readable format. This format makes it easier for users to understand the events and makes it easier to analyze the events using filters, rules, reports, and data monitors. In one embodiment, the common format is the Common Event Format (CEF) log management standard.

Aggregation and filtering reduce the volume of events sent to the manager 130, which saves network bandwidth and storage space, increases the manager's efficiency and accuracy, and reduces event processing time. The agent 120 sends events to the manager 130 in batches based on the expiration of a time period or based on a threshold number of events being reached.

The agent 120 may also send commands to the data source 110 and/or execute commands on the local host, such as instructing a scanner to run a scan. These actions can be executed manually or through automated actions from rules and data monitors. Furthermore, the agent 120 may add information to the data that it has collected, such as by looking up an Internet Protocol (IP) address and/or hostname in order to resolve IP/hostname lookup at the manager 130, or by determining timing-related data (e.g., event occurrence time, etc.).

The agent 120 is configured via an associated configuration file (not shown). The agent 120 can include software module(s) including a normalizing component, a time correction component, an aggregation component, a batching component, a resolver component, a transport component, and/or additional components. These components can be activated and/or deactivated through appropriate commands in the configuration file. During configuration, the agent 120 is registered to a manager 130 and configured with characteristics based on its data source 110 and desired behavior. The agent 120 is further configurable through both manual and automated processes. For example, the manager 130 can send to the agent 120 a command or configuration update.

A manager 130 provides analysis capabilities, case management workflow capabilities, and services capabilities. Communications between the manager 130 and an agent 120 can be bi-directional (e.g., to enable the manager 130 to transmit a command to the platform hosting the agent 120) and encrypted. In some installations, the manager 130 can act as a concentrator for multiple agents 120 and can forward information to other managers 130 (e.g., managers deployed at a corporate headquarters). To perform its tasks, the manager 130 uses a variety of filters, rules, reports, data monitors, dashboards, and network models.

Analysis can include detection, correlation, and escalation. For example, the manager 130 cross-correlates the events received from the agents 120 using a rules engine (not shown), which evaluates each event with network model and vulnerability information to develop real-time threat summaries. Regarding case management, the manager 130 can maintain reports regarding the status of security incidents and their resolution. The manager 130 can also provide access to a knowledge base.

As events are received by the manager 130, the events are stored in a database 140. Storing the events enables them to be used later for analysis and reference. In one embodiment, the database 140 is a database management system (e.g., columnar, relational, hybrid, etc.).

A user interacts with the manager 130 via a user interface 160. The user interface 160 enables the user to navigate the features and functions of the manager 130. A single manager 130 can support multiple user interface instances. The features and functions that are available to the user can depend on the user's role and permissions and/or the manager's configuration. In one embodiment, access control lists enable multiple security professionals to use the same manager 130 and database 140 but each professional has his own views, correlation rules, alerts, reports, and knowledge bases appropriate to his responsibilities. Communication between the manager 130 and the user interface 160 is bi-directional and can be encrypted. The user interface 160 may be used to receive queries to be executed on logged data.

In one embodiment, a logging system 170 is an event data storage appliance that is optimized for extremely high event throughput. The logging system 170 stores events (sometimes referred to as "log data"), such as security events. In one embodiment, the events are stored in compressed form. However, the logging system 170 can retrieve these events on demand and restore them to their original, unmodified form for forensics-quality data. Multiple logging systems 170 can work together to scale up to support high sustained input rates when storing events. Event queries can be distributed across a peer network of logging systems 170. A user can configure the logging system 170 and provide queries via a user interface (not shown).

The logging system 170 can receive both processed events (e.g., events adhering to the Common Event Format) and raw events. In one embodiment, raw events are received directly from data sources 110 (such as syslog messages and log files), and processed events are received from agents 120 or managers 130. The logging system 170 can also send both raw events and processed events. In one embodiment, raw events are sent as syslog messages (to any device; not shown), and processed events are sent to the manager 130.

The logging system 170 includes an event clustering module 172. The event clustering module 172 is configured to receive event data in the form of chunks, which includes a metadata structure and a compressed version of a set of events. The set of events may be grouped by receipt time ("rt"). In other words, the events can be thought of as being clustered according to rt. The metadata structure may act as a search index (e.g., cluster index) when querying event data. The event clustering module 172 is configured to identify chunks for further processing, and to cluster events from those identified chunks according to the time of an event's occurrence ("et"). Chunks are generated for the re-clustered events and are stored, for example in a read-optimized system ("ROS"). The logging system 170 will be further described below with respect to FIG. 2.

Through the above-described architecture, the system 100 can support a centralized or decentralized environment. This is useful because an organization may want to implement a single instance of the system 100 and use an access control list to partition users. Alternatively, the organization may choose to deploy separate systems 100 for each of a number of groups and consolidate the results at a "master" level. Such a deployment can also achieve a "follow-the-sun" arrangement where geographically dispersed peer groups collaborate with each other by passing primary oversight responsibility to the group currently working standard business hours. systems 100 can also be deployed in a corporate hierarchy where business divisions work separately and support a rollup to a centralized management function.

Event Data

An example of the type of data stored in the data storage system is event data. An event is an instance of data collected and stored at the data storage system. The event may be associated with or describe an activity or action that was performed. In general, an event is generated once and does not change afterwards. The event data includes event(s). The event data may be comprised of log data, which can be generated by various sources (including devices and applications), and can be in any format. An event can be, for example, an entry in a log file, an entry in a syslog server, an alert, an alarm, a network packet, an email, a notification, etc.

The event data may be correlated and analyzed to identify network security threats. A security event is a type of event and is any activity that can be analyzed to determine if it is associated with a security threat. The activity may be associated with a user, also referred to as an actor, to identify the security threat and the cause of the security threat. Activities may include logins, logouts, sending data over a network, sending emails, accessing applications, reading or writing data, etc. A security threat includes activity determined to be indicative of suspicious or inappropriate behavior, which may be performed over a network or on systems connected to a network. Common security threats, by way of example, are user attempts to gain unauthorized access to confidential information, such as social security numbers, credit card numbers, etc., over a network.

The data sources for the events may include network devices, applications or other types of data sources described below operable to provide event data that may be used to identify network security threats. Event data is data describing events. Event data may be captured in logs or messages generated by the data sources. For example, intrusion detection systems (IDSs), intrusion prevention systems (IPSs), vulnerability assessment tools, firewalls, anti-virus tools, anti-spam tools, and encryption tools may generate logs describing activities performed by the source. Event data may be provided, for example, by entries in a log file or a syslog server, alerts, alarms, network packets, emails, or notification pages.

Event data includes implicit meta-data and a message. Implicit meta-data can include information about the device or application that generated the event, for example, the device or application that generated the event ("event source") and when the event was received from the event source ("receipt time"). In one embodiment, the receipt time is a date/time stamp, and the event source is a network endpoint identifier (e.g., an IP address or Media Access Control (MAC) address) and/or a description of the source, possibly including information about the product's vendor and version. The time attributes, source information and other information is used to correlate events with a user and analyze events for security threats. The time attributes may be further used as keys to identify events that satisfy a query.

The message represents what was received from the event source and can be in any form (binary data, alphanumeric data, etc.). In one embodiment, the message is free-form text that describes a noteworthy scenario or change. In another embodiment, the message also includes explicit meta-data. Explicit meta-data is obtained, for example, by parsing the message. When an event source generates an event, the event usually includes information that indicates when the event occurred ("et"). The event occurrence time, which is usually a date/time stamp, is an example of explicit meta-data and is frequently used for analysis.

In one embodiment, if an event does not include an occurrence time, an implicit timestamp generated by an event receiver when it was received the event (described below) is treated as the original occurrence timestamp. As an event is processed and potentially forwarded through various systems, each system may have an implicit notation of event receipt time.

In one embodiment, an event represents a data structure that includes field(s), where each field can contain a value (sometimes referred to as an "attribute"). If different events include the same types of fields, then the events can be organized in a table. Each row of the table would represent a different event, and each column of the table would represent a different field.

Logging System Architecture

Figure 2:
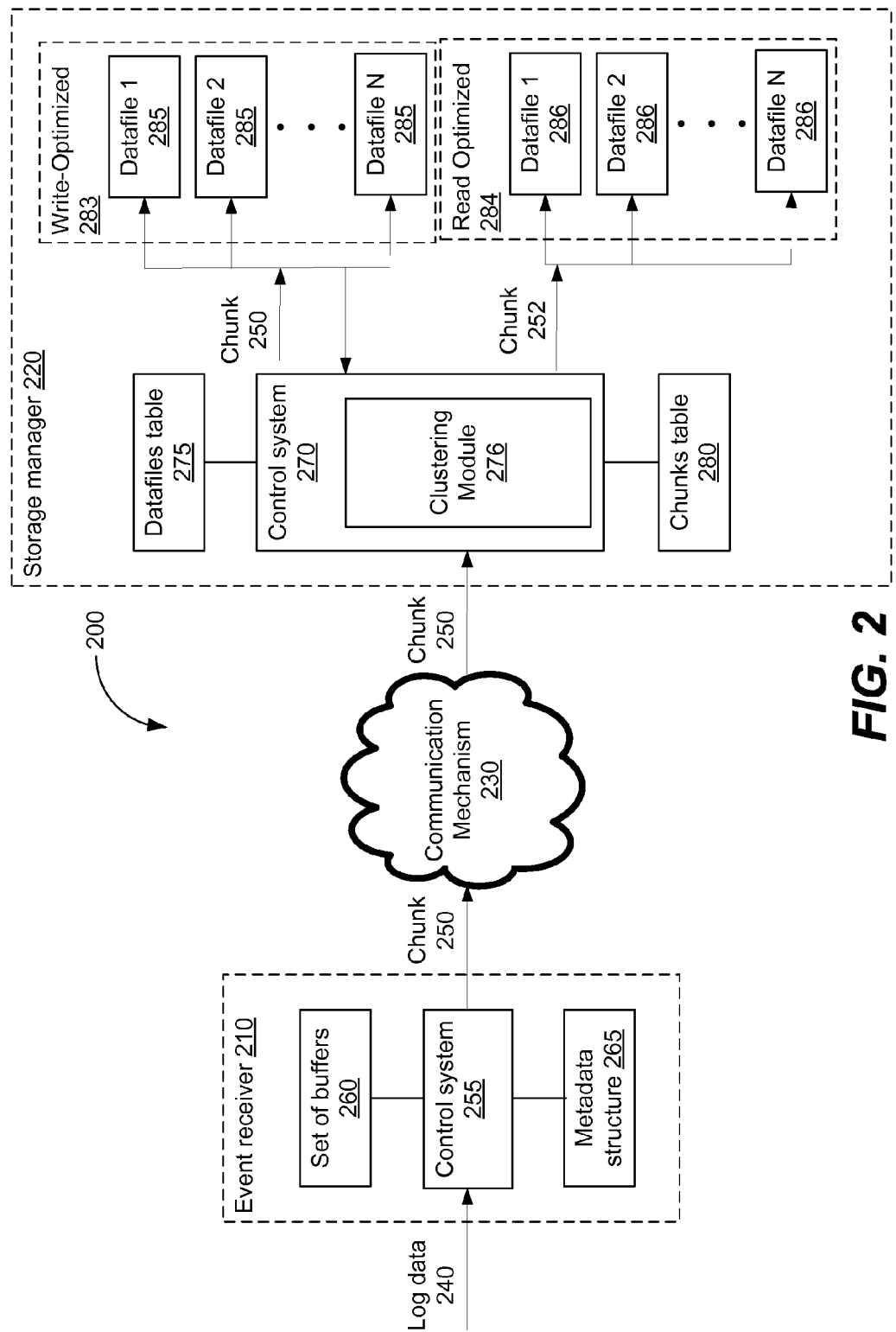
FIG. 2 is a topological block diagram of a logging system of an information/event management system in accordance with an embodiment.

FIG. 2 is a topological block diagram of a logging system 200 of an information/event management system in accordance with an embodiment. In the illustrated embodiment, the logging system 200 includes an event receiver 210, a storage manager 220, and a communication mechanism 230. Although one event receiver 210 is shown for clarity, the system 200 can support a large number of concurrent sessions with many event receivers 210. In one embodiment, each event receiver 210 is associated with a unique identifier.

The event receiver 210 receives log data 240, processes the log data 240, and outputs a data "chunk" 250. The event data may be received in the form of a stream. Log data may include events. The event receiver 210 includes a control system 255, a set of buffers 260, and a metadata structure 265. The control system 255 is communicatively coupled to the set of buffer(s) 260 and the metadata structure 265. The control system 255 controls operation of the event receiver 210, separates the log data into one or more events, and determines when each event was received by the event receiver 210. The control system 255 stores in the buffer 260 the events, and, for each event, a time/date stamp that reflects when the event was received, and also updates the metadata structure 265. The control system 255 generates a data chunk 250 based on the metadata structure 265 and the contents of the buffer 260, which, as further described below, includes information about events. In one embodiment, a chunk includes the metadata structure 265 and a compressed version of the contents of the buffer 260. Different chunks can have different sizes, and a maximum size may be specified. A chunk is finally generated, for example, when buffer 260 is full or when a particular period of time (a "timeout window") has elapsed, during which no events were received by buffer 260.

Each buffer 260 stores information regarding one or more events. The set of buffers 260 stores row-based chunks and/or column-based chunks. In one embodiment, a buffer's size is fixed but the size itself is configurable. If different events include the same types of fields, the events can be organized in a table. Each row of the table may represent a different event, and each column of the table may represent a different field. In one embodiment, each buffer 260 is associated with a particular field and includes values from that field ("attribute") from one or more events. In another embodiment, each buffer 260 also includes an identifier ("IndexID") that indicates which field is associated with the buffer.

For example, assume that an event includes a field called SourceIPAddress whose value reflects the IP address of the device that initiated the action represented by the event. A buffer 260 associated with the SourceIPAddress field would contain one or more IP addresses (one IP address for each event that was received and processed by the event receiver 210 as part of the log data 240). The buffer 260 might also contain an IndexID value of "100," which indicates the SourceIPAddress field.

In another embodiment, the set of buffers also includes a ReceiptTime buffer that stores, for each event, a time/date stamp that reflects when the event was received by the event receiver 210.

The metadata structure 265 stores metadata about the contents of the set of buffers 260. In one embodiment, this metadata includes the unique identifier associated with the event receiver 210 that received the events, the number of events in the set of buffers, and, for each of fields of interest (e.g., receipt time, event occurrence time), a minimum value and a maximum value that reflect the range of values (e.g., time range) of that field over all of the events in the set of buffers. More specifically, the metadata of the chunk may include, along with other information, start_rt and end_rt to denote the start and end of the receipt time range. Furthermore, the metadata may include start_et and end_et to denote the start and end of the event occurrence time range. The metadata structure 265 acts as an index (i.e., cluster index) when querying event data.

In one embodiment, receipt time ("rt") is a field of interest. In this embodiment, the metadata structure 265 stores a minimum value and a maximum value that reflect the range of values of receipt times over all of the events in the set of buffers. The minimum value of rt is the receipt time for the event in the set of buffers 260 that was received first. The maximum value of rt is the receipt time for the event in the set of buffers 260 that was received last.

Additionally, event occurrence time ("et") is also a field of interest. In this embodiment, therefore, the metadata structure 265 also stores a minimum value and a maximum value that reflect the range of values of event occurrence times over all of the events in the set of buffers. The minimum value of et is the event occurrence time for the event in all events that occurred first. The maximum value of et is the event occurrence time for the event in all events that occurred last.

The storage manager 220 receives data chunk(s) 250 and stores them so that it can be queried. In one embodiment, storage manager 220 operates in a streaming manner to reduce the memory overhead. The storage manager 220 includes a control system 270, a datafiles table 275, a chunks table 280, a set of datafiles 285 in a write-optimized system ("WOS") 283, and a set of datafiles 286 in a read-optimized system ("ROS") 284. The WOS 283 may be any one of a row-based storage system, column-based storage system, or a hybrid row/column storage system. Likewise, the ROS 284 may be any one of a row-based storage system, column-based storage system, or a hybrid row/column storage system. The control system 270 is communicatively coupled to the datafiles table 275, the chunks table 280, and the sets of datafiles 285 and datafiles 286.

The control system 270 controls operation of the storage manager 220 and includes a clustering module 276. Clustering module 276 is configured to determine event data in the form of chunks, which includes events clustered according to receipt time ("rt") of the event. This event data is accessed via WOS 283. The event clustering module 276 is further configured to identify sparse or overlapping chunks, and cluster events from those identified chunks according to an event time of occurrence ("et"). Chunks 252 are generated for the re-clustered events and are stored in ROS 284.

The datafiles table 275 stores information about the sets of datafiles 285 and datafiles 286. In one embodiment, each entry in the datafiles table 275 represents one datafile 285 or one datafile 286 for which space has been allocated, and the entry includes a unique identifier associated with the datafile and the location of the datafile (e.g., a file system, a path therein, and a file name). A datafile 285 and datafile 286 listed in the datafiles table 275 may or may not contain data (e.g., chunks 250). The datafiles table 275 is stored, for example, in a database (not shown). In one embodiment, datafiles 285 and datafiles 286 are allocated before being needed. In this embodiment, a list of these pre-allocated datafiles 285 and datafiles 286 (called a "free list") is maintained. The datafiles table 275 may include multiple tables, for example having a table associated with datafiles 285 and another table associated with datafiles 286.

The chunks table 280 stores and maintains information about the chunk(s) 250 and chunks 252 that are stored in the storage manager 220 (specifically, stored in the datafile(s) 285 and datafile(s) 286). In one embodiment, this information includes, for each chunk 250 and chunk 252, the metadata stored in the chunk and the location of the chunk (e.g., the unique identifier associated with the datafile that stores the chunk and the location within the datafile where the chunk is stored (e.g., as an offset)). The chunks table 280 is stored, for example, in a database (not shown). The chunks table 280 may include multiple tables, for example having a table associated with datafiles 285 and another table associated with datafiles 286.

A datafile 285 stores multiple chunks 250. In one embodiment, all datafiles are the same size (e.g., 1 gigabyte) and are organized in time order. A datafile 286 stores multiple chunks 252. In one embodiment, all datafiles are organized in time order, where datafiles 285 are organized in order by receipt time and datafiles 286 are organized in order by event occurrence time. The datafile 285 and datafile 286 are stored, for example, on a raw disk or in a data storage system such as a file system (not shown).

The communication mechanism 230 communicatively couples the event receiver 210 and the storage manager 220. In one embodiment, the communication mechanism 230 includes a partially-public or wholly-public network such as the Internet. In other embodiments, the communication mechanism 230 includes a private network or one or more distinct or logical private networks (e.g., virtual private networks or local area networks). Communication links to and from the communication mechanism 230 can be wired or wireless (e.g., terrestrial- or satellite-based transceivers). In one embodiment, the communication mechanism 230 is a packet-switched network such as an IP-based wide or metropolitan area network that uses the Ethernet protocol.

In another embodiment, the communication mechanism 230 is local to a single computer system (e.g., if a portion of the event receiver 210 and a portion of the storage manager 220 are executing on the same device). In this embodiment, the communication mechanism 230 is implemented, for example, through a local, software-only loopback device. For example, the data is copied to various locations in memory, and communication occurs via an API.

In yet another embodiment, the communication mechanism 230 is local to a single process (e.g., if a portion of the event receiver 210 and a portion of the storage manager 220 are executing on the same device and in the same process). In this embodiment, the communication mechanism 230 is implemented, for example, through shared memory and/or pointers thereto.

Checkpoints

To ensure reliability, the storage manager 220 processes the events in batches (e.g., 1000 chunks) and creates checkpoints after processing each chunk batch. The frequency at which the checkpoints are created is configurable. A checkpoint can be thought of as a marker which indicates that the data up to a particular point in time has been processed. In the occurrence of a system crash, the system can resume processing the data from the point in time after the marker was set.

Clustering Based on Event Occurrence Time

Figure 3A:
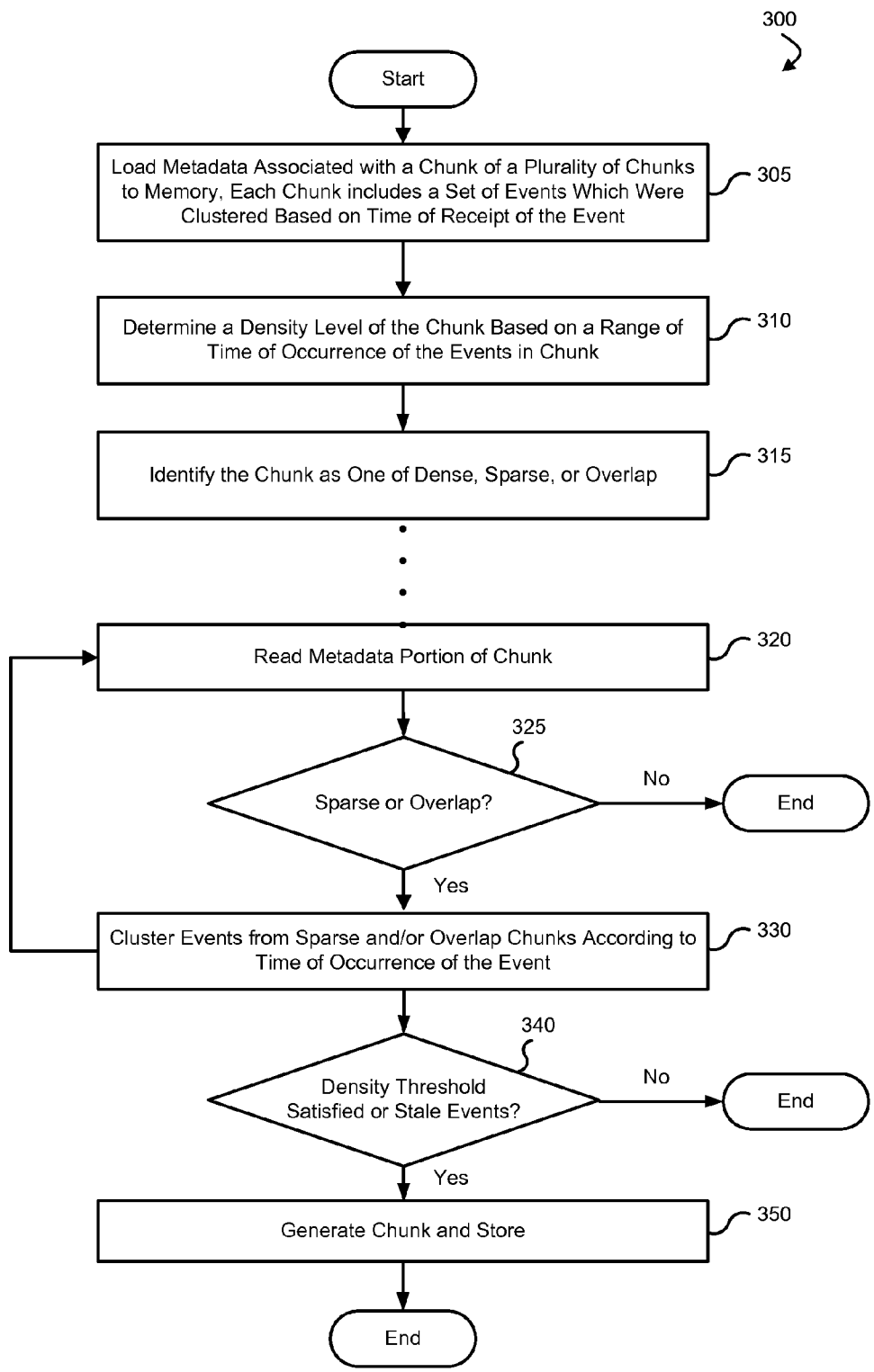
FIG. 3A is a process flow diagram for generating a chunk of events based on event occurrence time in accordance with an embodiment.

FIG. 3A is a process flow diagram for generating a chunk of events based on event occurrence time in accordance with an embodiment. The depicted process flow 300 may be carried out by execution of sequences of executable instructions. In another embodiment, various portions of the process flow 300 are carried out by components of an information/event management system, an arrangement of hardware logic, e.g., an Application-Specific Integrated Circuit (ASIC), etc. For example, blocks of process flow 300 may be performed by execution of sequences of executable instructions in a clustering module of the information/event management system.

Events are clustered along multiple time dimensions, and an index is maintained for each of the relevant time dimensions. In one embodiment, all events are clustered along a primary time dimension, and a subset of those events are re-clustered along a secondary time dimension. The events that are re-clustered are those which were a part of a cluster (along the primary time dimension) that does not have minimized ranges for the relevant time dimensions and/or maximized chunk size. As used herein, chunk size refers to the number of events in a chunk.

In one embodiment, events are clustered by time of receipt ("rt"), which is the primary time dimension, and the resulting chunks are saved in a write-optimized store. The secondary time dimension may be event occurrence time ("et"). As described below, steps 305-315 describe the process of determining the density level of chunks. The density level is used to identify the subset of events for re-clustering, i.e., clustering according to the secondary time dimension. Determining the density level may be performed offline after the chunk is generated, received, or stored (e.g., in a datafile). Alternatively, density levels are determined in a streaming manner as they are received.

At step 305, metadata associated with a chunk is read, for example, to memory. The metadata of the chunk includes, along with other information, start_rt, end_rt, start_et and end_et to denote the start and end time ranges of the events grouped in the particular chunk. Each chunk includes a set of events which were clustered based on the associated receipt time. The associated metadata may be stored in the chunk and thus is extracted from the chunk. The metadata may be extracted when the chunk is generated, received, or after the chunk has been stored (e.g., in a datafile). In another embodiment, the metadata is stored separately from the datafile and is retrieved, for example, from a chunks table. As previously described, the metadata structure acts as an index. As such, the metadata structure associated with each cluster may include an index for the range of receipt times of the chunk (clustered by receipt time) and another index for the range of event occurrence times for the same chunk.

At step 310, a density level of the chunk is determined, based on a range of event occurrence times of the events in the chunk. The range of event occurrence times is determined from the associated metadata. The density level may be determined by dividing the total number of events in the chunk by the range of event occurrence times, for example:

$$\text{density} = \frac{\text{number of events in chunk}}{(\text{end } et - \text{start } et)}$$

At step 315, the chunk is identified, for example as being one of a dense, sparse, or overlap chunk, for example, using a tag.

A dense chunk is one in which the et range is relatively short. The et range may be measured against a dense time range threshold. For a dense chunk, the events need not be shuffled into new chunks.

A sparse chunk is one in which the et range is relatively long. The et range may be measured against a sparse time range threshold. In other words, the chunk is sparse with respect to et, and therefore needs to be merged into other chunks. The sparse time range threshold is greater than the dense time range threshold.

An overlap chunk is one in which the et range of a dense chunk overlaps with the et range of a sparse chunk. In other words, an overlap chunk is a dense chunk which overlaps (in et time range) with a sparse chunk, and as such, can be optimized by the re-clustering process. The manner in which overlap chunks are optimized is further described below.

To tag these chunks efficiently, an interval tree may be used. The intervals are built on [start_et, end_et] the event occurrence time ranges for all the chunks. The interval trees allow fast lookup of range intersections (i.e., O(log n) time), and as such, the tagging process is quite efficient. The tag may be maintained in memory, or alternatively, may be stored on disk. In another embodiment, the chunk is tagged with the raw density level and is characterized as being one of dense, sparse, or overlap later during the re-clustering process.

The subset of chunks for re-clustering are then selected. At step 320, the metadata portion of the chunk is read from storage (e.g., write-optimized storage ("WOS"), into memory. In one embodiment, the chunks are read in order of start_et for the range of event occurrence times for the chunk, such that the chunks having events with the earlier start event occurrence times are read first.

At step 325, it is determined whether the chunk is either a sparse chunk or an overlap chunk. If the chunk is neither sparse nor overlap, it is determined the chunk is a dense chunk. As previously discussed, the events in a dense chunk need not be shuffled, and as such, processing ends.

On the other hand, where the chunk is found to be either a sparse or overlap chunk, processing continues to step 330, where events from sparse and/or overlap chunks are re-clustered or otherwise clustered according to time of occurrence of the events. Clustering according to the primary and secondary time dimensions minimizes both the ranges of et and rt of the chunks. Re-clustering is further described with respect to FIG. 3B. Processing then continues back to step 320, where the metadata portion of another chunk is read.

At any time during the re-clustering process, it is determined whether a density threshold has been satisfied or stale events are detected, at step 340.

The density threshold ensures that the chunks that are created as a part of the re-clustering process are optimized by minimizing the et range. The density threshold may be configurable. Where the density of any new chunk-information is greater than the density threshold, it is determined there are enough events in the chunk. At step 350, a new chunk is generated and all events in the newly-generated chunk are saved in a read-optimized storage ("ROS") and removed from memory.

During the re-clustering process, there may be some events that are not clustered with other events, for example, based on some incongruity with the event occurrence times. Therefore, it is possible to have events which can stay in memory for a long time, without actually getting written to the read-optimized store. These events may be stale events. To reduce the memory overhead, stale events may be grouped into N chunks, where the number N is configurable. These chunks are stored in ROS, and cleared from memory.

As such, the detection of stale events is another trigger for generating and storing a chunk in the ROS and removing all events in the chunk from memory. A stale event is an event that has an event occurrence time that is less than (or earlier in time from) the start event occurrence time of a current chunk. As previously described, chunks are read in ascending order of the starting event occurrence time in the range of event occurrence times. The current chunk is the latest chunk to be read. Stale events are removed from memory since there cannot be any events with event occurrence time less than the start event occurrence time of a current chunk, as chunks are read in order of the starting event occurrence time. In one embodiment, the stale events are grouped together in a chunk and stored. The stale event chunk is created, for example, when the chunk size meets a threshold (e.g., 5000 stale events).

If neither the density threshold has been satisfied nor stale events are detected, no additional steps are taken and the re-clustering process continues. On the other hand, if either condition is satisfied, a chunk is generated and saved in storage, for example a read-optimized storage ("ROS"), at step 350. The metadata associated with the newly-generated chunk is updated, for example, to reflect the range of receipt time values and event occurrence time values over all the events in the chunk.

One or more structures may store information about the chunks that are stored in both the write-optimized storage and the read-optimized storage. When a new chunk is generated, the associated metadata and location of the chunk in the read-optimized storage is maintained. For example, a chunks table may be updated to include information of a newly-generated chunk. Specifically, an entry in the chunks table may be added. The entry includes the metadata associated with the new chunk (including range of rt and range of et) and the location of the chunk (e.g., the unique identifier associated with the ROS datafile that stores the chunk and the location within the datafile where the chunk is stored (e.g., as an offset)).

In one embodiment, the entries of the original chunk are maintained. Alternatively, these entries may be removed from the chunks table and from disk, for example, if all of the information in the original chunks are exactly replicated from the original chunk. As used herein, an original chunk is one that has events grouped by the primary time dimension.

The events may be clustered and/or re-clustered in real-time, thereby avoiding expensive I/Os that would be otherwise introduced by loading the events in an offline manner and subsequently clustering. Furthermore, clustering based on multiple dimensions may improve query performance for any database management system (e.g., row-oriented, column-oriented, etc.) with temporal data attributes.

Furthermore, the size of the newly-generated chunks may be kept as close as possible to the original chunk sizes, being neither too large nor too small. For example, a dense chunk will fall within the range of a max chunk size threshold (e.g., 50,000 events) and a minimum chunk size threshold (e.g., 5000 events). Generating too small chunks will create a large amount of metadata information, and there will be a small number of event for each metadata entry. Having more chunks and thereby more metadata entries will increase the size of the metadata store, which may involve more disk, processor, and time for management. Furthermore, the larger metadata store will increase the time taken to read entries therein during query time.

A delayed event is one that transfers through the network slowly and is delayed when finally received. A batched event is one that that is purposefully delayed prior to being transmitted (e.g., events are collected and sent as a batch every 10 minutes). Batched, delayed, or otherwise late events can be stored and queried efficiently. Since the re-clustering process creates chunks which have events grouped by event occurrence time, the batched or delayed events can be merged in a chunk along with other events with nearby event occurrence times. As a result, these type of late events can be quickly queried using the chunk's metadata.

Figure 3B:
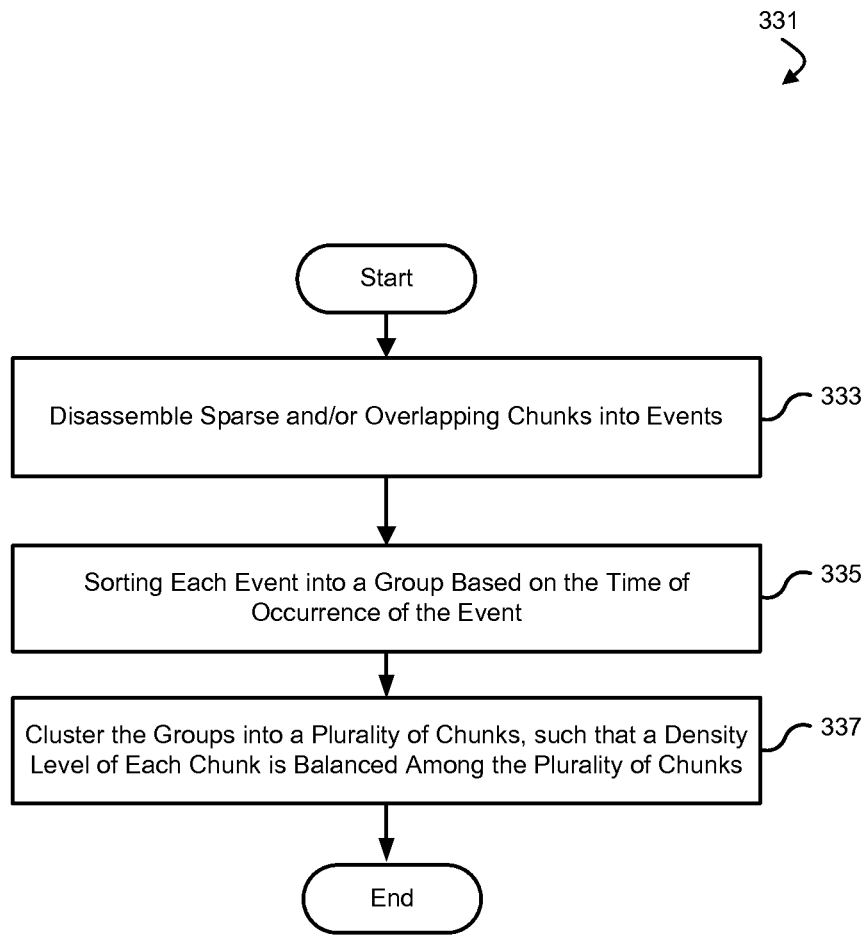
FIG. 3B is a process flow diagram for clustering events into chunks based on event occurrence time in accordance with an embodiment.

FIG. 3B is a process flow diagram for clustering events into chunks based on a event occurrence time in accordance with an embodiment. The depicted process flow 331 may be carried out by execution of sequences of executable instructions. In another embodiment, various portions of the process flow 331 are carried out by components of an information/event management system, an arrangement of hardware logic, e.g., an Application-Specific Integrated Circuit (ASIC), etc. For example, blocks of process flow 331 may be performed by execution of sequences of executable instructions in a clustering module of the information/event management system.

In one embodiment, a subset of chunks have been identified for re-clustering. Clustering may be performed on a secondary time dimension, such as an event occurrence time. The chunks that were identified for re-clustering (e.g., sparse and/or overlapping chunks) are read, for example from a write-optimized storage ("WOS"), into memory. At step 333, the sparse and/or overlapping chunks are disassembled into their constituent events. In other words, the events in the identified chunks are read into memory.

At step 335, each event is sorted into a group, based on the time of occurrence of the event. Each group is associated with a specified et time range (e.g., one minute ranges). By placing the events in these groups, the memory overhead and the management tasks for creating balanced chunks may be reduced.

At step 337, the groups are clustered into a plurality of chunks, such that a density level of each chunk is balanced among the plurality of chunks. For example, an augmented red-black tree structure may be implemented to generate the balanced chunks. Each group, as opposed to each individual event, may be implemented as a node in the tree, which reduces overhead and management.

Each node in the augmented tree may maintain the density of the events in its sub-trees. The density of a node is the number of events in the sub-tree divided by the difference between the maximum event occurrence time in the sub-tree and the maximum event occurrence time in the subtree, for example:

$$\text{node density} = \frac{\text{number of events in subtrees}}{\max_{sub} et - \min_{sub} et}$$

These density values are maintained as events are added or removed and the tree is rebalanced. When the tree is sufficiently balanced, the optimized chunks are created and stored in the read-optimized storage. As such, both the ranges of et and rt of the newly-generated chunks are minimized, while the chunk size is maximized.

For overlap chunks in particular, the events in a sparse chunk that overlap with the events in a dense chunk are merged with the events in the dense/overlap chunk. As a result of the merge, the dense chunk becomes denser. Stated another way, the events in the sparse chunk which overlap with the dense chunk are identified. These events are merged, by event occurrence time, with the dense chunk.

Figure 4A:
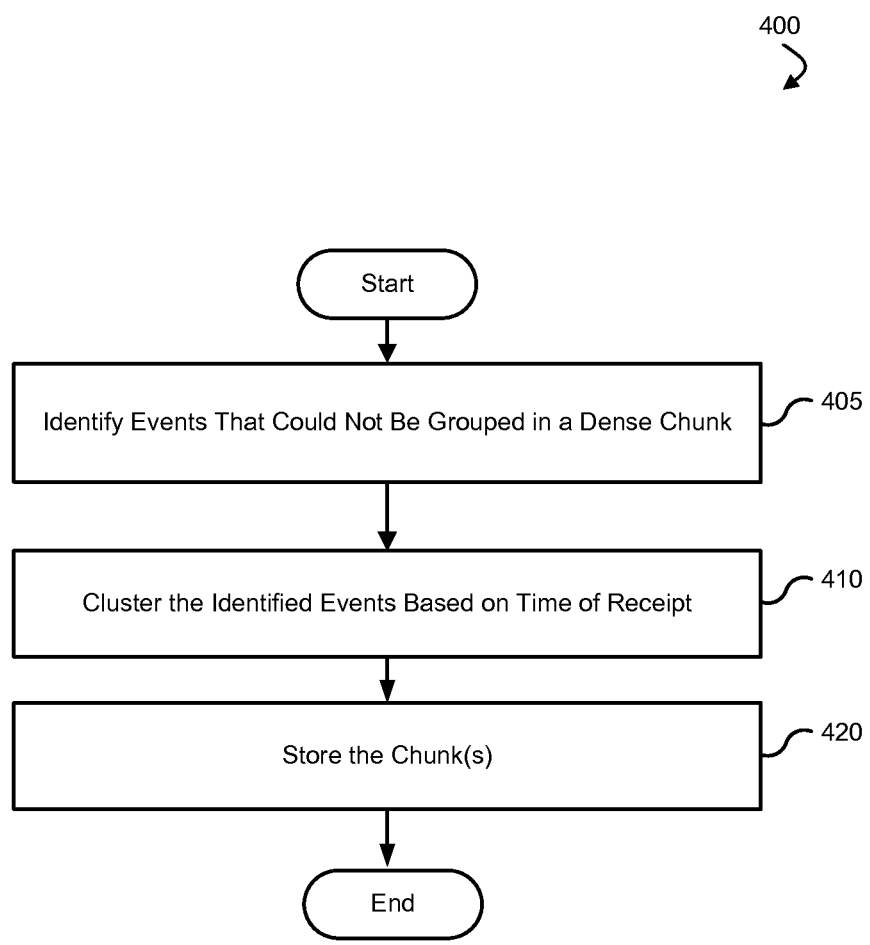
FIG. 4A is a process flow diagram for clustering sparse event streams in accordance with an embodiment.

FIG. 4A is a process flow diagram for clustering sparse event streams in accordance with an embodiment. The depicted process flow 400 may be carried out by execution of sequences of executable instructions. In another embodiment, various portions of the process flow 400 are carried out by components of an information/event management system, an arrangement of hardware logic, e.g., an Application-Specific Integrated Circuit (ASIC), etc. For example, blocks of process flow 400 may be performed by execution of sequences of executable instructions in a clustering module of the information/event management system.

At step 405, the events that could not be grouped in a dense chunk are identified. At step 410, the identified events are clustered into chunks, for example based on time of receipt of the event. Since these chunks do not satisfy the minimum density threshold, they are sparse chunks. The metadata associated with the newly-generated chunk is updated, for example, to reflect the range of receipt time values and event occurrence time values over all the events in the chunk. In another embodiment, the events are grouped into a chunk to satisfy a minimum density parameter (S). For example, a number of events from memory are grouped into a chunk when the chunk satisfies the minimum density threshold S, and are stored in ROS.

At step 420, the chunks are stored, for example in a read-optimized storage ("ROS"). All events in the chunk are removed from memory. A chunks table is updated to include information of a newly-generated chunk. Specifically, an entry in the chunks table may be added. The entry includes the metadata associated with the new chunk (including range of rt and range of et) and the location of the chunk (e.g., the unique identifier associated with the ROS datafile that stores the chunk and the location within the datafile where the chunk is stored (e.g., as an offset)).

The minimum density threshold ensures that the target chunks will have at least S density. This may prevent an adversary from creating a sparse event stream that can possibly create large numbers of sparse chunks.

As such, the generated chunks are more dense. For a normally distributed event stream, denser chunks create fewer splits, hence improving query performance.

Querying/Data Retrieval

After a chunk has been stored in a datafile, such as datafile 285 or datafile 286, the events within the chunk can be queried. A query is represented as an expression that can be evaluated against an event. The expression includes one or more search terms. In one embodiment, the query process occurs in multiple phases. The first phase identifies which data chunks (if any) could contain an event that satisfies the query. The second phase disassembles the identified chunks into their constituent events. The third phase identifies which of these events (if any) satisfy the query. The first phase thereby acts as a "rough cut" for identifying which data chunks (and their events) should be investigated further and which data chunks (and their events) should be ignored.

In the first phase, search terms within the query are identified that concern information that was contained in the metadata as stored in the chunks table 280. This metadata information includes, for each field of interest, a minimum value and a maximum value that together reflect the range of values of that field over multiple events in the same data chunk. Recall, the chunks table 280 stores the metadata information for chunks in both the write-optimized storage and the read-optimized storage. When new chunks were created as a part of the re-clustering process, the metadata associated with those new chunks was also stored in the chunks table 280. Thus, in order to search the events, the "metadata search terms" are used to search the chunks table 280. This will yield which chunks (if any) could contain an event that satisfies the metadata search terms. In this way, a search can be constrained based on particular values (or ranges of values) for fields of interest (since these values are stored in the metadata in the chunks table 280), including both receive time and the event occurrence time.

Because "field of interest" metadata is expressed as a range of values, the fact that a chunk satisfies a metadata search term does not necessarily mean that the chunk contains an event that satisfies the metadata search term. For example, if the metadata search term is a field value of event occurrence time of 3:10 PM and the chunk contains events whose event occurrence times are 3:05 PM and 3:15 PM, respectively, then 3:10 PM will fall within the range, and the chunk will be identified as satisfying the metadata search term. However, the chunk may not contain an event with a field value of 10. (That is why the query occurs in two phases.) What is always true, however, is that if a chunk could contain an event that satisfied the search term, then that chunk will be identified as satisfying the search term.

In the second phase, the identified chunks are disassembled into their constituent events. If the event portion of a chunk includes a compressed version of the events, then the event portion is decompressed before it is divided into its constituent events.

In the third phase, each event is compared with the complete set of search terms in order to determine whether the event satisfies the search terms. In one embodiment (not shown), the events are analyzed in a particular order. For example, the events are analyzed based on their event receipt time. Analyzing the events in a particular order and appending matching events to the search results means that the events in the search results will already be in that particular order. No sorting of the events is involved.

The search may be performed on events that are stored in chunks 250. However, the logging system 170 may contain additional events in the event receiver 210 (e.g., within the set of buffers 260) that have not yet been stored in a chunk. In one embodiment, the search will not be performed on these events. In one embodiment, before the process is initiated, the set of buffers 260 are flushed so that the events will be sent to the storage manager 220 and stored in a chunk. This way, when the search is executed, the events that were formerly in the set of buffers will be searched also. In another embodiment, a separate search is executed on the event receiver 210 using the contents of the metadata structure 265 and the set of buffers 260, similar to the search described above. This way, all events will be searched, whether they are stored in the storage manager 220 or in the event receiver 210.

Figure 4B:
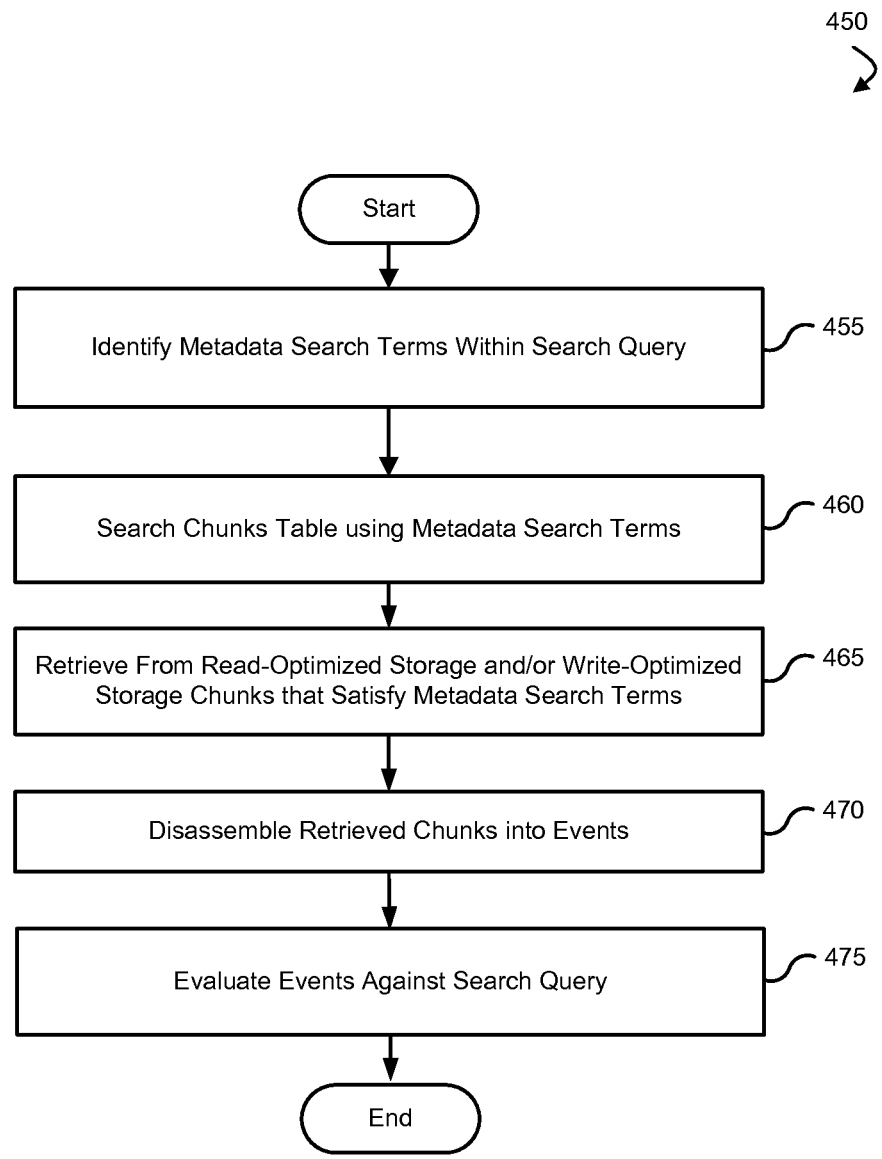
FIG. 4B is a process flow diagram for querying in accordance with an embodiment.

FIG. 4B is a process flow diagram for querying in accordance with an embodiment. The depicted process flow 450 may be carried out by execution of sequences of executable instructions. In another embodiment, various portions of the process flow 450 are carried out by components of an information/event management system, an arrangement of hardware logic, e.g., an Application-Specific Integrated Circuit (ASIC), etc. For example, blocks of process flow 450 may be performed by execution of sequences of executable instructions in a clustering module of the information/event management system.

A search query may be received. The search query includes one or more search terms. Any metadata search terms (within the received search query) are identified at step 455. For example, the search term is with respect to a time dimension, such as event occurrence time or time of receipt. In one embodiment, both of these time dimensions are "fields of interest," and thus have value ranges stored in the metadata portions of any chunks in the WOS 283 and/or ROS 284 and in the chunks table 280.

At step 460, a chunks table is searched using the metadata search terms. Recall that each entry in the chunks table 280 corresponds to a chunk 250, and an entry includes the metadata stored in the chunk and the physical location of the chunk in either a write-optimized store or a read-optimized store. The identified metadata search terms are used to search the metadata portion of the chunks table 280.

At step 465, the chunks that satisfy the metadata search terms are retrieved from the read-optimized storage ("ROS") and/or the write-optimized storage ("WOS") using the location of the chunk, which was stored in the chunks table.

The retrieved chunks are disassembled 470 into their constituent events. At step 475, each event is evaluated against the search query in order to determine whether the event satisfies the query. If an event satisfies the query, it is included in the search results.

For example, one common type of search term includes a timestamp field (e.g., Event Receipt, Event Occurrence) and a period of time (e.g., a start time and an end time). The search query may specify: select count(*) from events where A=X, B=Y, and where Event Occurrence is between Monday 12:00 AM and Tuesday 12:00 AM. Assume the attribute A is in ROS, but the attribute B is not.

In operation, the metadata search term (i.e., event occurrence range) is identified, as described in step 455. At step 460, the event occurrence range is used to search the chunks table, which includes an index keyed on the event occurrence range. The entries that satisfy the metadata search term are identified. As previously discussed, each entry includes the location of the chunk (e.g., the unique identifier associated with the datafile that stores the chunk and the location within the datafile where the chunk is stored (e.g., as an offset)). The datafiles may be either in ROS or WOS. In one embodiment, it is determined which parts of the query can be satisfied by the ROS alone. For all others, the WOS is accessed, for example, after reducing the time range as needed.

Since the ROS can be queried more efficiently than the WOS, the ROS is searched first. The chunks table may be referenced to identify and retrieve from the ROS datafiles all chunks that satisfy the event occurrence time range, as described at step 465.

The retrieved ROS chunks (from the ROS datafiles) are then disassembled into their constituent events. The search query is evaluated on these events, as described at step 475. In particular, the events are scanned quickly to identify which satisfy the condition A=X.

To reduce the metadata search term time range, and therefore provide enhanced search performance, the subset of the range of the ROS chunks that satisfied the condition A=X is determined. For example, these ROS chunks may have an event occurrence time range of Monday 12:00 AM-Monday 1:00 PM, and Monday 4:00 PM-Tuesday 12:00 AM. The search term time range may be reduced to event occurrence time of Monday 1:01 PM-Monday 4:00 PM, to cover the gap in the total time range in the search query. As such, the range of event occurrence times that are searched are significantly smaller than in the original search query.

In a recursive manner, the chunks table may be referenced again, this time to identify all WOS chunks that satisfy the reduced event occurrence time range, as described at step 460. The chunks table may be referenced to identify and retrieve from the WOS datafiles all chunks that satisfy the reduced event occurrence time range, as described at step 465. The retrieved ROS chunks (from the ROS datafiles) are then disassembled into their constituent events, as described at step 470. The search query is evaluated on these events, as described at step 475. In particular, the events are scanned quickly to identify which satisfy the condition B=Y.

Figure 5:
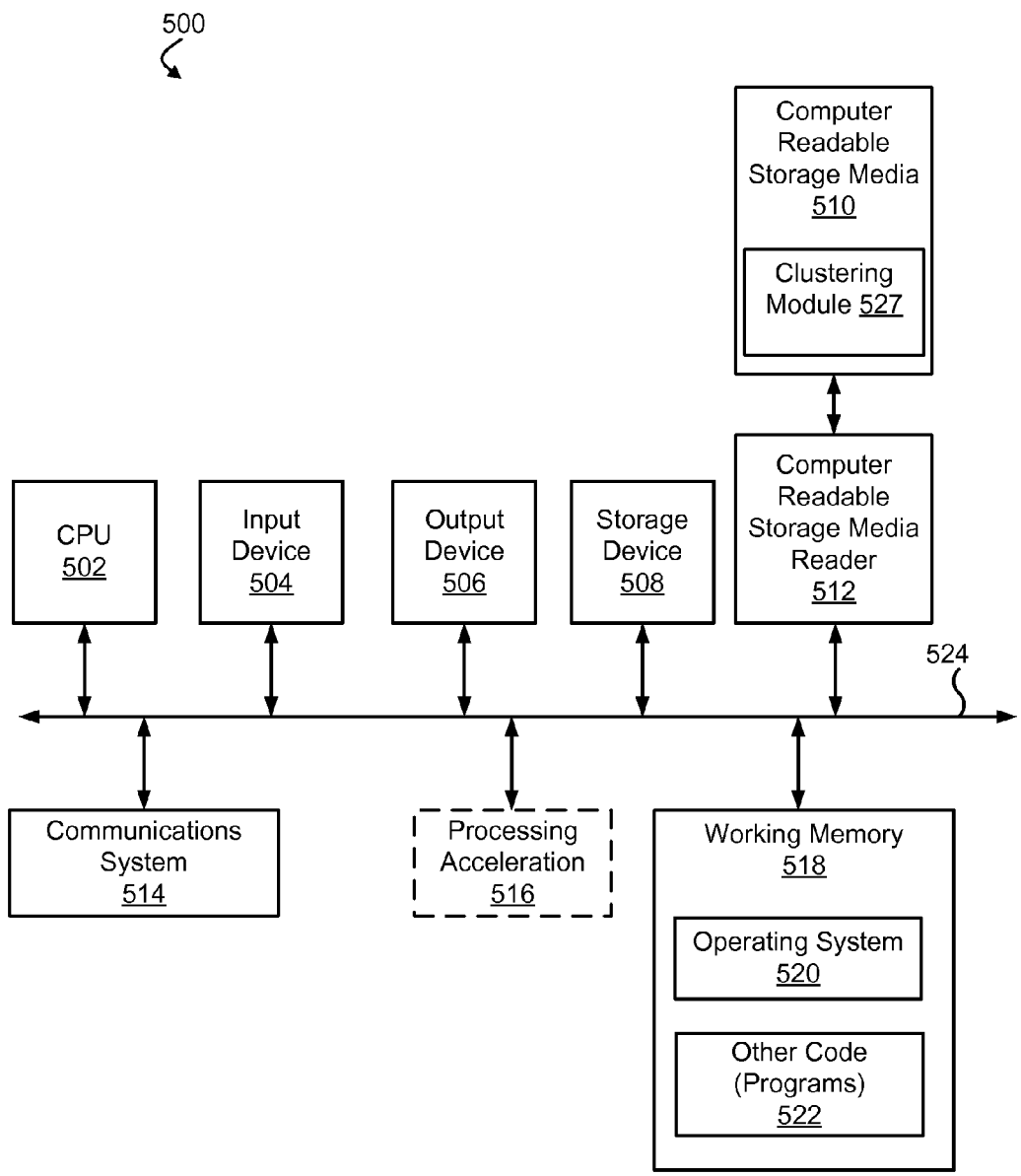
FIG. 5 illustrates a computer system in which an embodiment may be implemented.

FIG. 5 illustrates a computer system in which an embodiment may be implemented. The system 500 may be used to implement any of the computer systems described above. The computer system 500 is shown comprising hardware elements that may be electrically coupled via a bus 524. The hardware elements may include at least one central processing unit (CPU) 502, at least one input device 504, and at least one output device 506. The computer system 500 may also include at least one storage device 508. By way of example, the storage device 508 can include devices such as disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 512, a communications system 514 (e.g., a modem, a network card (wireless or wired), an infra-red communication device, etc.), and working memory 518, which may include RAM and ROM devices as described above. In some embodiments, the computer system 500 may also include a processing acceleration unit 516, which can include a digital signal processor (DSP), a special-purpose processor, and/or the like.

The computer-readable storage media reader 512 can further be connected to a computer-readable storage medium 510, together (and in combination with storage device 508 in one embodiment) comprehensively representing remote, local, fixed, and/or removable storage devices plus any tangible non-transitory storage media, for temporarily and/or more permanently containing, storing, transmitting, and retrieving computer-readable information (e.g., instructions and data). Computer-readable storage medium 510 may be non-transitory such as hardware storage devices (e.g., RAM, ROM, EPROM (erasable programmable ROM), EEPROM (electrically erasable programmable ROM), hard drives, and flash memory). The communications system 514 may permit data to be exchanged with the network and/or any other computer described above with respect to the system 500. Computer-readable storage medium 510 includes a clustering module 527.

The computer system 500 may also comprise software elements, which are machine readable instructions, shown as being currently located within a working memory 518, including an operating system 520 and/or other code 522, such as an application program (which may be a client application, Web browser, mid-tier application, etc.). It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

The specification and drawings are, accordingly, to be regarded in an illustrative rather than a restrictive sense. It will, however, be evident that various modifications and changes may be made.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

What is claimed is:

1. A method for processing network activity log data, the method comprising:
receiving, by a server computing device from a networked device communicatively connected to the server computing device over a network, a plurality of events generated and collected by the networked device;
clustering, by the server computing device, the plurality of events to form a plurality of data chunks, wherein:
each of the plurality of data chunks includes a subset of the plurality of events clustered according to a primary time dimension field of each event of the plurality of events;
for each data chunk among the plurality of data chunks, determining, by the server computing device, a density level of the data chunk;
selecting, by the server computing device, a subset of the data chunks for re-clustering based on the determined density level, including each data chunk for which the determined density level is less than a threshold;
disassembling, by the server computing device, the subset of data chunks into a plurality of events;
re-clustering, by the server computing device, the disassembled plurality of events to form a re-clustered data chunk, wherein at least one event among the plurality of events is re-clustered in the re-clustered data chunk according to a secondary time dimension field of the at least one event;
identifying, by the server computing device, network security threats using the re-clustered data chunk; and
performing, by the server computing device, a countermeasure against the identified network security threats.

2. The method of claim 1, wherein the range of the primary time dimension field comprises:
a minimum value of the primary time dimension field of all of the events in the data chunk and a maximum value of the primary time dimension field of all of the events in the data chunk.

3. The method of claim 1, wherein selecting the subset comprises:
for each data chunk in the set of data chunks:
determining, based on the density level of the data chunk, whether the data chunk is a sparse chunk or a dense chunk.

4. The method of claim 1, wherein determining the density level comprises:
determining a number of events associated with the chunk; and
dividing the number of events by a range of the secondary time dimension field of the events of the data chunk.

5. The method of claim 1, further comprising:
comparing a range of a secondary time dimension field of the chunk to a dense time range threshold; and
determining the chunk is a dense chunk if the range meets the dense time range threshold.

6. The method of claim 1, further comprising:
comparing the range of the secondary time dimension field of the chunk to a range of the secondary time dimension field of the sparse chunk; and
determining the chunk is an overlap chunk if the range of the chunk overlaps with a time range threshold of a sparse chunk.

7. The method of claim 1, wherein the density level of the data chunks is balanced among the plurality of re-clustered data chunks.

8. The method of claim 1, wherein the primary time dimension field is an event receipt time.

9. The method of claim 1, wherein the secondary time dimension field is an event occurrence time.

10. The method of claim 1, further comprising:
storing the re-clustered data chunk in a datafile in a read-optimized store; and
updating a metadata structure to include information about the re-clustered data chunk.

11. The method of claim 1, further comprising:
receiving a search query that includes a set of search terms;
identifying at least one search term, from the set of search terms, that concerns event time information that is contained in a metadata structure; and
searching the metadata structure by comparing the identified search term to a minimum value of the primary time dimension field and to a minimum value of the secondary time dimension field.

12. The method of claim 1, further comprising determining:
a metadata structure that comprises a range of the primary time dimension field of all of the events in the data chunk; and
a range of a secondary time dimension field of all of the events in the data chunk.

13. The method of claim 12, wherein the range of the secondary time dimension field comprises:
a minimum value of the secondary time dimension field of all of the events in the data chunk and a maximum value of the secondary time dimension field of all of the events in the data chunk.

14. The method of claim 1, further comprising:
comparing the range of the secondary time dimension field of the chunk to a sparse time range threshold; and
determining the chunk is a sparse chunk if the range meets the sparse time range threshold.

15. The method of claim 1, wherein the subset of the data chunks selected for re-clustering based on the determined density level further includes each data chunk for which the determined density level is greater than the threshold and that has an event time range overlapping an event time range of a data chunk for which the determined density level is less than the threshold.

16. The method of claim 15, wherein the event time range of each data chunk is equal to an end time of the events of the data chunk minus a start time of the events of the data chunk.

17. A server computing device comprising:
network hardware to communicatively connect to a networked device over a network;
a hardware storage device comprising a chunks table and a read-optimized store;
a processor; and
a non-transitory computer-readable data storage medium storing instructions executable by the processor to:
receive, from the networked device over the network, a plurality of events generated and collected by the networked device;
generate a plurality of data chunks by clustering the plurality of events according to a primary time dimension field of each event;
maintain for each data chunk, a metadata structure within the chunks table;

store the data chunks within the read-optimized store;
determine a density level of each data chunk;
select a subset of the data chunks for re-clustering based on the determined density level, including each data chunk for which the determined density level is less than a threshold;
re-cluster a data chunk using events of the subset, wherein the events of the subset are grouped according to the secondary time dimension field; and
identify network security threats using the re-clustered data chunk,
wherein a countermeasure is performed against the identified network security threats.

18. A non-transitory computer-readable medium storing instructions executable by a hardware processor of a server computing device communicatively connected to a networked device over a network to cause the hardware processor to:
receive, from the networked device over the network, a plurality of events generated and collected by the networked device;
cluster the plurality of events to form a plurality of data chunks, each of the plurality of data chunks includes a subset of the plurality of events clustered according to a primary time dimension field of each event of the plurality of events;
for each data chunk among the plurality of data chunks, determine a density level of each data chunk of the plurality of data chunks;
select a subset of the data chunks for re-clustering based on the determined density level, including each data chunk for which the determined density level is less than a threshold;
disassemble the subset of data chunks into a plurality of events;
re-cluster the disassembled plurality of events to form a re-clustered data chunk, wherein at least one event among the plurality of events is re-clustered in the re-clustered data chunk according to a secondary time dimension field of the at least one event;
identify network security threats using the re-clustered data chunk;
perform a countermeasure against the identified network security threats.

19. The non-transitory computer-readable medium of claim 18, further including instructions executable by the hardware processor to cause the hardware processor to:
for each data chunk among the plurality of data chunks, determine a metadata structure that comprises a range of the primary time dimension field of all of the events in the data chunk.

20. The non-transitory computer-readable medium of claim 18, further including instructions executable by the hardware processor to cause the hardware processor to:
for each data chunk among the plurality of data chunks, determine a range of a secondary time dimension field of all of the events in the data chunk.

* * * * *